S. JELALIAN.
TRANSMISSION DRIVE FOR DIRIGIBLE AIRSHIPS.
APPLICATION FILED JUNE 11, 1914.

1,118,205. Patented Nov. 24, 1914.

WITNESSES:
Asadour Ellian
Sarkis Shanisian

INVENTOR:
Sarkis Jelalian

UNITED STATES PATENT OFFICE.

SARKIS JELALIAN, OF CRANSTON, RHODE ISLAND.

TRANSMISSION-DRIVE FOR DIRIGIBLE AIRSHIPS.

1,118,205.

Specification of Letters Patent.   Patented Nov. 24, 1914.

Application filed June 11, 1914. Serial No. 844,554.

*To all whom it may concern:*

Be it known that I, SARKIS JELALIAN, a citizen of the United States, residing at the city of Cranston, in the county of Providence and State of Rhode Island, have invented certain new and useful Improvements in Transmission-Drives for Dirigible Airships, of which the following is a specification.

The present invention relates to a manually-operated device for transmitting power to drive the propellers and wings of dirigible air-ships.

The object in view is to provide a transmission device designed to be located between a pair of motors, to easily permit of transmitting the power medium to cause a dirigible air-ship to continue to travel forwardly, whenever one motor, of the pair, becomes disabled.

My invention consists of the novel construction and combination of parts, as hereinafter described and claimed, reference being had to the accompanying sheet of drawings, in which,—

Figure 1:
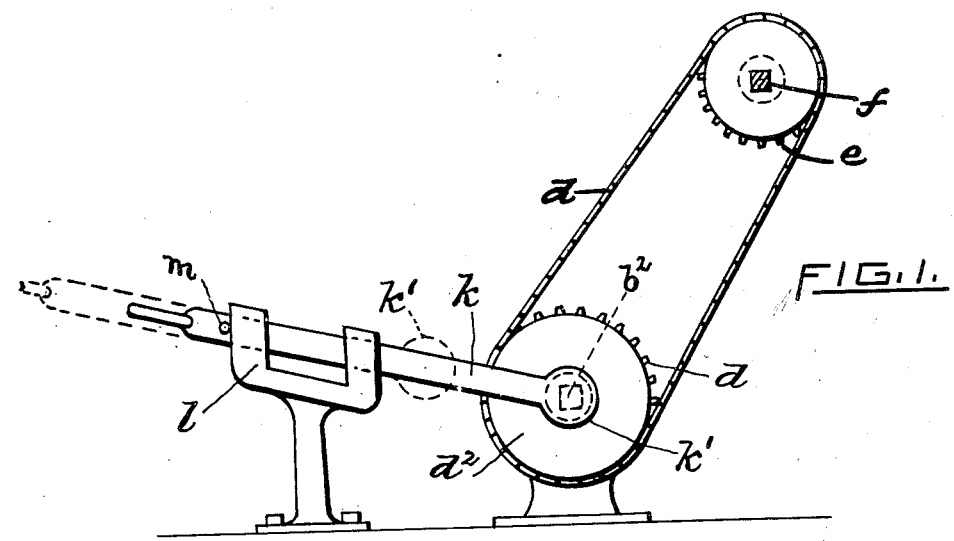
Figure 2:
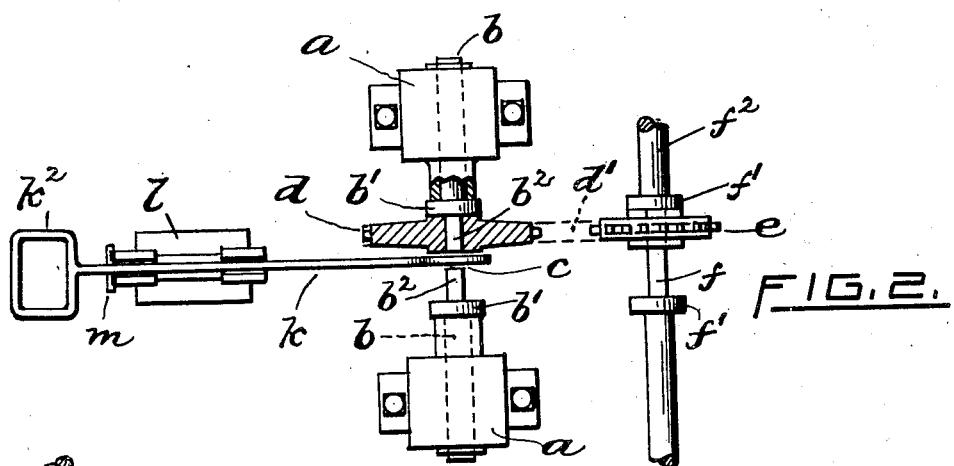
Figure 3:
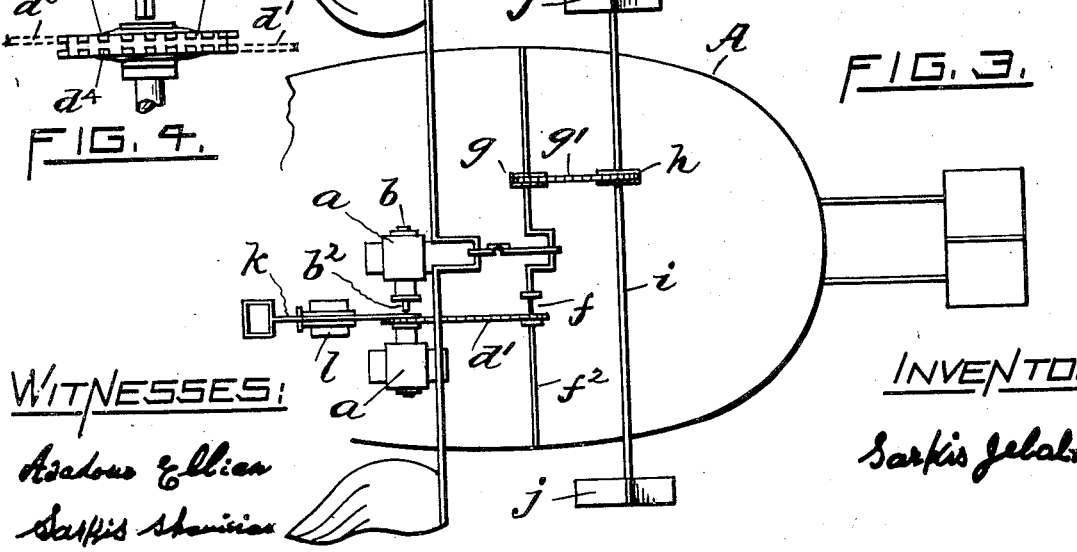

Figure 1 is a side elevation of my improved device; Fig. 2, a plan of the device; Fig. 3, a view showing the relation of the device as applied to the car of a dirigible airship, and, Fig. 4, a detail view, showing the main sprocket as designed for a double chain connection.

Like reference characters indicate like parts.

My device, which is designed to be operable within the car of a dirigible air-ship, consists of a pair of motors —$a$, $a$— which have their main shafts —$b$, $b$— in axial alinement to each other and transverse of the body of the car A, and each shaft —$b$— has an integral concentric collar —$b^1$— from which projects a flat-sided extension —$b^2$—. The outer ends of the shaft-extensions —$b^2$— are separated from each other in order to provide a narrow working space —$c$— for a hand lever —$l$—. A sprocket wheel —$d$— is designed to have a sidewise sliding movement upon the extensions —$b^2$—, and said wheel has a chain connection —$d^1$— with a sprocket wheel —$e$—. The wheel —$e$— has a sidewise sliding movement on a flat-sided portion —$f$—, formed between integral collars —$f^1$— concentric to a crank-shaft —$f^2$—. On the shaft —$f^2$— is made fast a sprocket wheel —$g$— which has a chain connection —$g^1$— with a sprocket wheel —$h$— fast on a shaft —$i$—, and at each end of the latter is secured a propeller —$j$—.

The motors —$a$— are arranged to revolve in the same direction, and the main sprocket —$d$— has its journal bearing for each extension —$b^2$— of a length sufficient to allow said sprocket, when pressed upon its side face by the hand of the operator, to pass freely across the gap, or space —$c$— and upon the other adjacent extension —$b^2$—, and thereby to cause the propellers —$j$—, through the chain connections —$d^1$—, —$g^1$—, to revolve in the opposite direction. To retain the main sprocket —$d$— in position upon either extension —$b^2$— I employ a lever —$k$—, which is operable longitudinally of the car and extending at an incline downwardly toward the axial centers of the motor shafts —$b$—. The lever —$k$— is slidable upon a fixed support —$l$—, and said lever has a disk —$k^1$— formed at one end thereof to fit in the space —$c$— between the shaft-extensions —$b^2$—, and a handle formed at its opposite end, as at —$k^2$—. A pin is secured in the operating lever —$k$— to form a stop, as —$m$—, to limit the downward movement of said lever. It is therefore apparent that to obtain a transmission drive all that is required is to withdraw the lever —$k$— from its holding position against the sprocket —$d$— and the latter made free to be easily moved to its normal point upon either motor shaft. Thus it is seen that whenever one motor, of a pair, becomes inoperative, my improved device readily permits of the opposite motor being thrown into action, to cause the craft to continue to travel forwardly.

Figure 4:
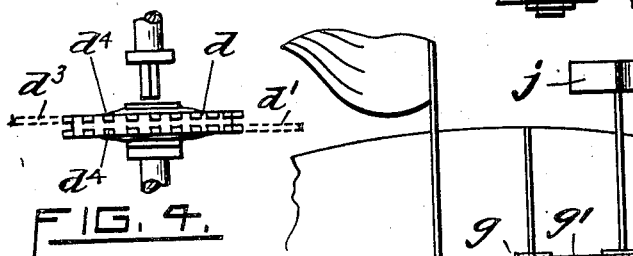

In Fig. 2 I show my improved device in which the sprocket —$d$— has a single chain connection —$d^1$—, to transmit power to drive a single propeller shaft —$i$—, and in order to make clear that the device may be advantageous in driving all of the propeller and wing-shafts, shown in my above-mentioned pending application, the said sprocket —$d$— may have two sets of teeth —$d^4$, $d^4$—, (see Fig. 4,) one set to engage the chain connection —$d^1$— and the other set to engage the chain connection indicated by dotted lines —$d^3$— in Fig. 4, in transmitting power to drive each and all of said shafts.

What I claim and desire to secure by Letters Patent is:—

1. In a device of the character described, the combination of motor-shafts arranged to revolve in the same direction, each shaft in axial alinement with the other, and each shaft having a projecting flat portion; a narrow space between the ends of the flattened portions of said shafts; a sprocket wheel slidable upon either flattened portion of said shafts, said wheel designed to engage one or more chain connections; a fixed support; a hand lever mounted in said support, said lever adapted to enter within the said space and to hold the said wheel to its normal working position upon either motor-shaft.

2. In a device of the character described, the combination with the propeller-shafts and reciprocating wing-shafts of a dirigible air-ship, of a pair of motor-shafts arranged to revolve in the same direction, each shaft having a projecting flat portion; a sprocket wheel designed to slide upon either flat portion of said shafts, said wheel having a plurality of sets of teeth for engagement with chain connections to drive said propeller-shafts and said wing-shafts, and a manually-operated lever to hold said wheel in position upon the flat portion of either motor-shaft.

3. In a transmission drive for dirigible air-ships having revolving propeller-shafts and reciprocating wing-shafts, the combination of a pair of motor-shafts arranged to revolve in the same direction; said shafts having their axial centers in alinement with each other and each shaft having a flattened inner end portion; a narrow space between the inner end portions of said motor-shafts; a sprocket wheel having a journal bearing of a length to permit said wheel to slide across the space and upon the flattened portion of either motor-shaft, and said wheel having independent sets of teeth; and a hand lever to enter the space and hold said wheel in position upon either motor-shaft.

In testimony whereof I affix my signature in presence of two witnesses.

SARKIS JELALIAN.

Witnesses:
ASADOAR ELLIAN,
SARKIS SHAMIRIAN.